USO10089077B1

United States Patent
Wang et al.

(10) Patent No.: US 10,089,077 B1
(45) Date of Patent: Oct. 2, 2018

(54) PARALLEL PROCESSING CIRCUITRY FOR ENCODED FIELDS OF RELATED THREADS

(71) Applicant: Apple Inc., Cupertino, CA (US)

(72) Inventors: Liang-Kai Wang, Austin, TX (US);
Terence M. Potter, Austin, TX (US);
Brian K. Reynolds, Austin, TX (US);
Justin Friesenhahn, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/402,820

(22) Filed: Jan. 10, 2017

(51) Int. Cl.
*G06F 7/50* (2006.01)
*G06F 7/505* (2006.01)

(52) U.S. Cl.
CPC .................................. *G06F 7/505* (2013.01)

(58) Field of Classification Search
CPC ....................................................... G06F 7/505
USPC ....................................................... 708/672
See application file for complete search history.

(56) References Cited

U.S. PATENT DOCUMENTS

| 5,148,528 A | 9/1992 | Fite et al. |
| 9,292,297 B2 | 3/2016 | Gopal et al. |
| 2008/0282066 A1 | 11/2008 | May |
| 2017/0293765 A1* | 10/2017 | Kang ................... G06F 21/602 |

* cited by examiner

Primary Examiner — Tan V. Mai
(74) Attorney, Agent, or Firm — Meyertons, Hood, Kivlin, Kowert & Goetzel, P.C.

(57) ABSTRACT

Techniques are disclosed relating to performing arithmetic operations to generate values for different related threads. In some embodiments, the threads are graphics threads and the values are operand locations. In some embodiments, an apparatus performs an arithmetic operation using first circuitry, on type value inputs for different threads that are encoded to represent values to be operated on by the first circuitry. In some embodiments, second arithmetic circuitry is configured to perform an arithmetic operation on an output of the first circuitry and an input (e.g., address information such as a base and an offset) that is common to the different threads and has a greater number of bits than the output of the first circuitry. In various embodiments, disclosed techniques may allow decoding of encoded values for different threads (which may reduce memory requirements relative to non-encoded values) with a shorter critical path and lower power consumption, e.g., relative to sequential decoding.

20 Claims, 8 Drawing Sheets

Perform arithmetic operation using first arithmetic circuitry, on input values having a first number of bits, where the input values are type values for different threads and ones of the type values are encoded to indicate: (a) an operation to be performed for a thread by the first arithmetic circuitry, relative to values for other threads and (b) an input value for the operation
510

Perform an arithmetic operation using second circuitry to generate a result, for a particular thread of the different threads, based on input values that include: (a) an output of the first arithmetic circuitry and (b) an input that is common to the different threads and has a greater number of bits than the output of the first arithmetic circuitry
520

PARALLEL PROCESSING CIRCUITRY FOR ENCODED FIELDS OF RELATED THREADS

BACKGROUND

Technical Field

This disclosure relates generally to graphics processors and more specifically to decoding values for related threads.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors (GPUs) are often included in mobile devices such as cellular phones, wearable devices, etc., where power consumption and processor area are important design concerns.

Special registers may be used to indicate the location of particular graphics data for related threads, such as pixel location, coordinate information, etc. The size of these registers may affect chip area and power, so their contents may be encoded to reduce the number of bits in each register. Encoding, however, introduces a need for additional circuitry and processing time to decode the register contents. Similar issues with arithmetic for related computing tasks may arise in a variety of contexts, in addition to operand location.

SUMMARY

Techniques are disclosed relating to performing arithmetic operations to generate values for different related threads. In some embodiments, the threads are graphics threads and the values are operand locations. In some embodiments, operand locations are encoded using a base address, an offset, and thread type values that indicate how to determine an operand location for the thread based on operand locations for other threads. For example, for four threads A, B, C, and D, thread A may have an operand at (base+offset), thread B may have an operand at (thread A's location+1) based on an type value for thread B, thread C may have an operand at (thread B's location−1) based on a type value for thread C, etc. In some embodiments, a "reset" type value may indicate that a given thread's value is not based on other threads (e.g., should be set to the base value).

Determining thread values sequentially (e.g., thread B based on thread A, then thread C based on thread B, etc.) may result in a relatively long critical path and may consume considerable power. In some embodiments, circuitry is configured to determine values for different threads in parallel, based on the type values of the other threads. For example, in some embodiments, type values are encoded in 2's complement format to represent values to be added to (or subtracted from) other threads. In some such embodiments, circuitry for a given thread includes a smaller adder configured to add type values and a larger adder configured to add an output of the smaller adder with other information having a larger number of bits (e.g., a base address and offset). In some embodiments, the circuitry for the particular thread is configured to zero inputs to the adders (e.g., type values to the smaller adder and the offset, in some embodiments) in response to detecting a reset type value for the particular thread.

In various embodiments, disclosed techniques may allow decoding of encoded values for different threads (which may reduce memory requirements relative to non-encoded values) with a shorter critical path and lower power consumption, e.g., relative to sequential decoding.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to"

perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1A:
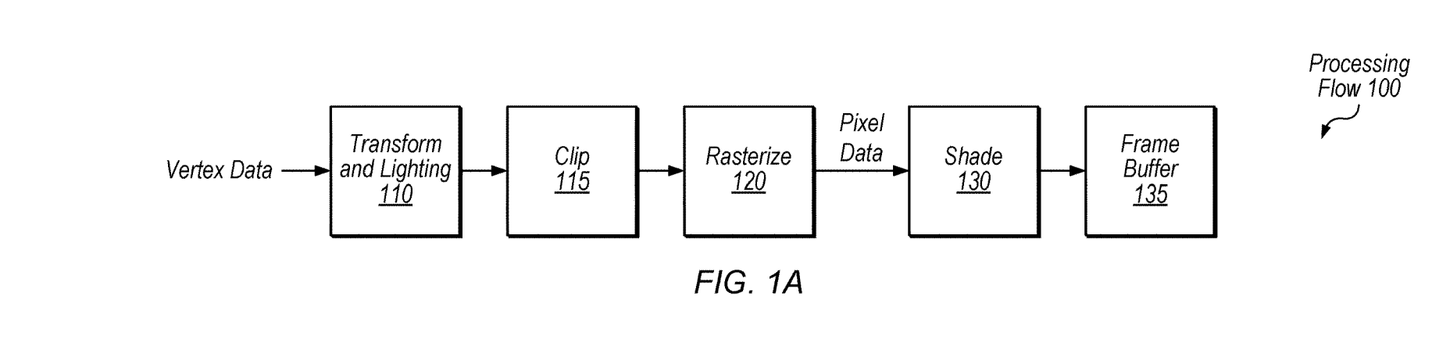
FIG. 1A is a block diagram illustrating an exemplary graphics processing flow.
Figure 1B:
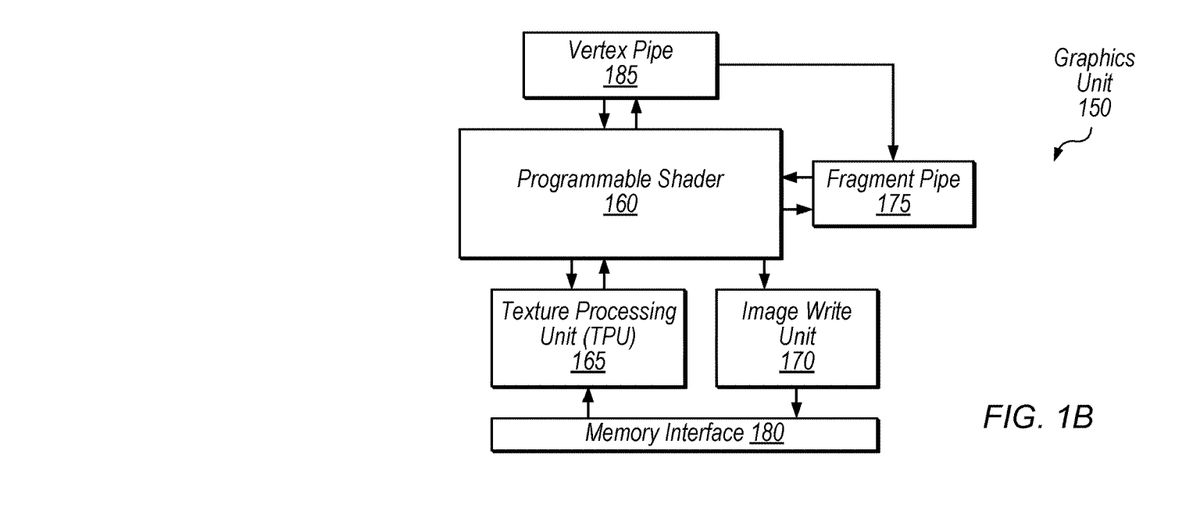
FIG. 1B is a block diagram illustrating one embodiment of a graphics unit.
Figure 2:
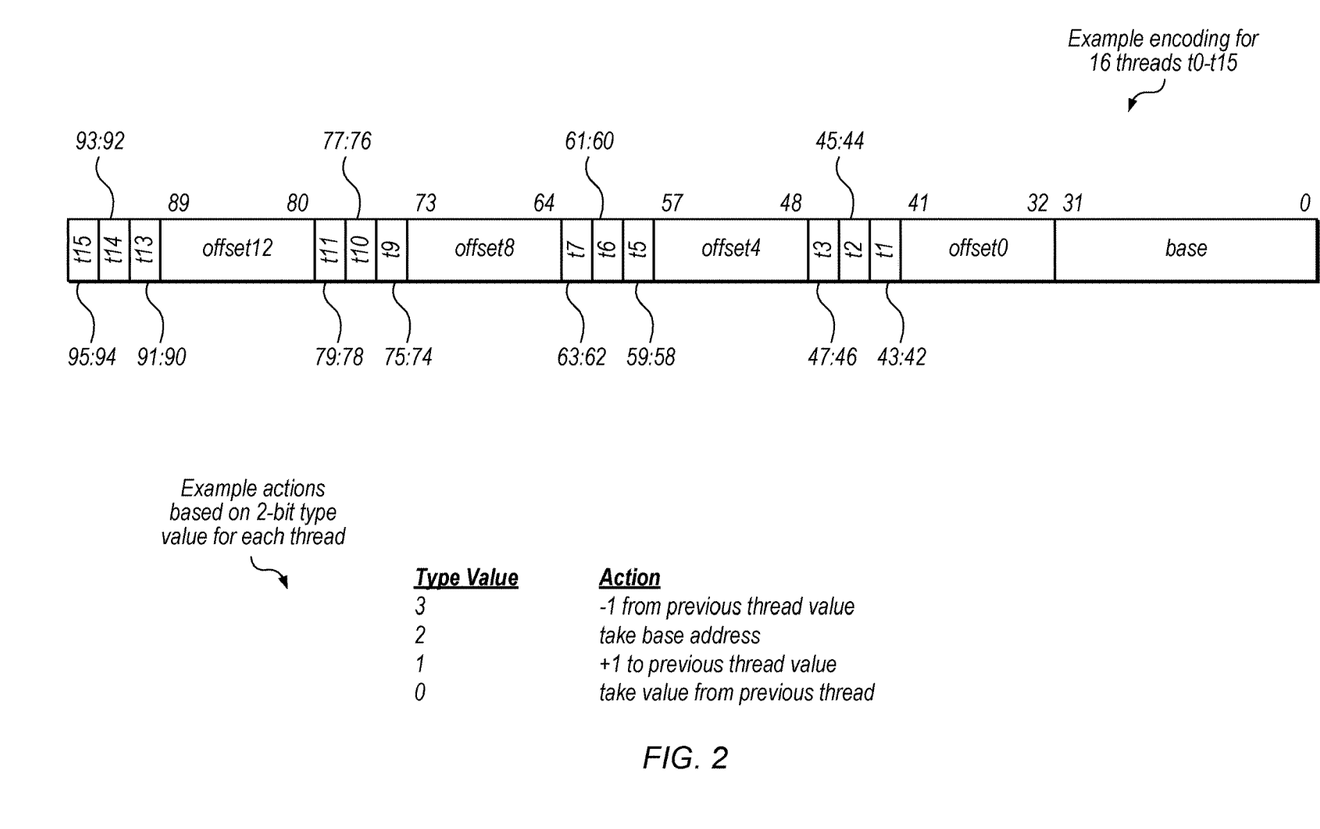
FIG. 2 is a diagram illustrating an exemplary register encoding, according to some embodiments.
Figure 3:
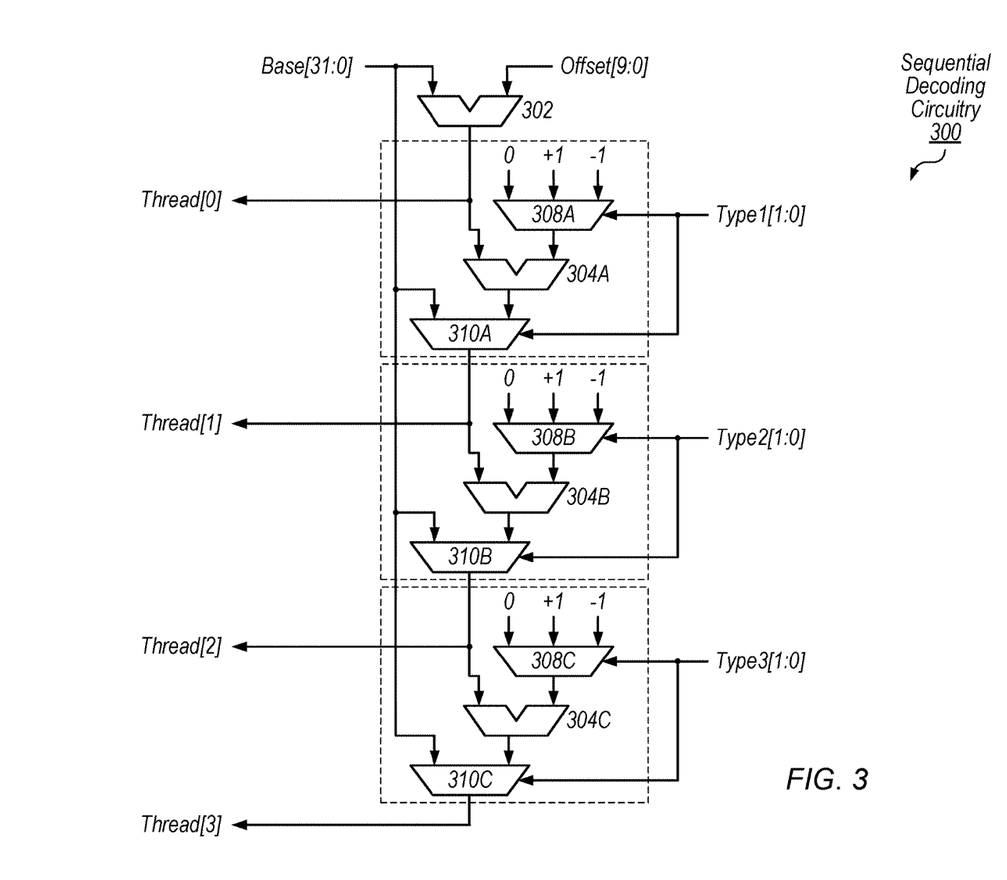
FIG. 3 is a diagram illustrating exemplary circuitry configured to determine operand locations for threads based on the encoding of FIG. 2, according to some embodiments.
Figure 4:
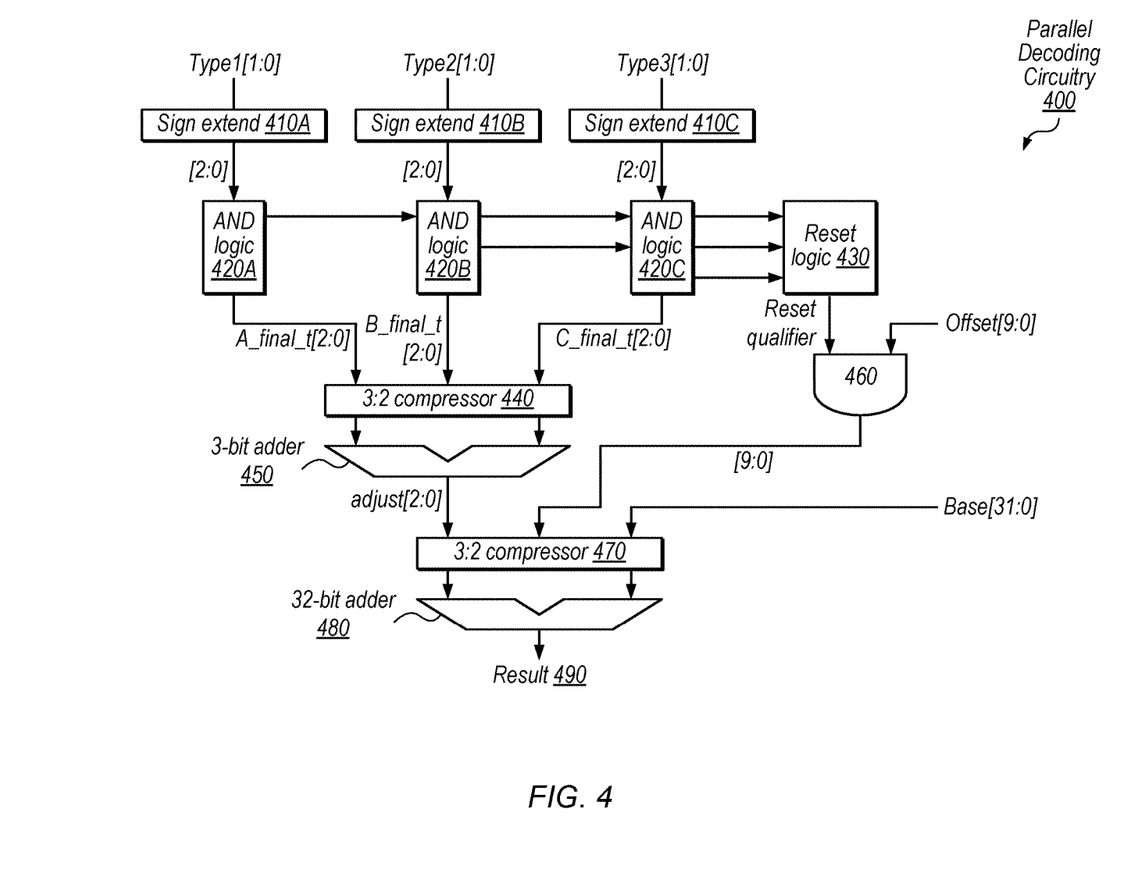
FIG. 4 is a diagram illustrating exemplary parallel circuitry configured to determine operand location for a thread based on the encoding of FIG. 2, according to some embodiments.
Figure 5:
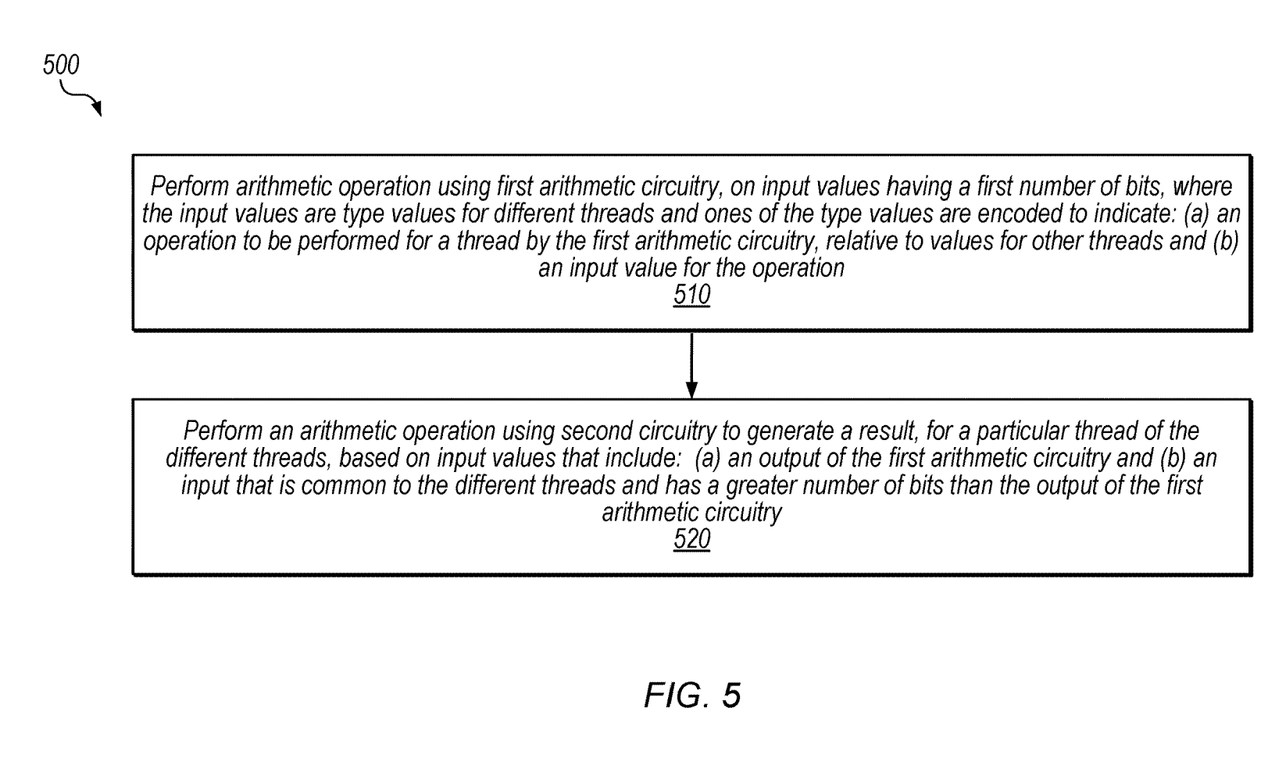
FIG. 5 is a flow diagram illustrating an exemplary method for performing an arithmetic operation using type values from different threads, according to some embodiments.
Figure 6:
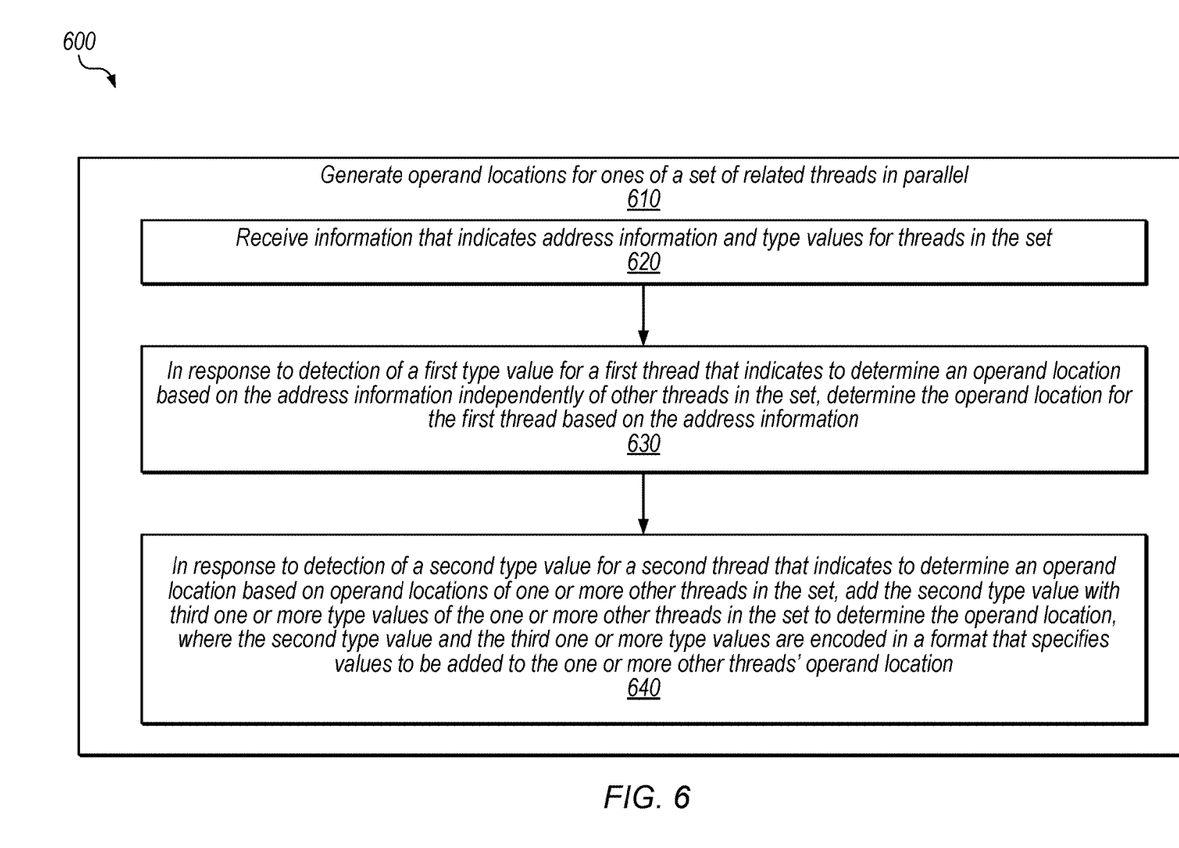
FIG. 6 is a flow diagram illustrating a more detailed method for performing an arithmetic operation using type values from different threads, according to some embodiments.
Figure 7:
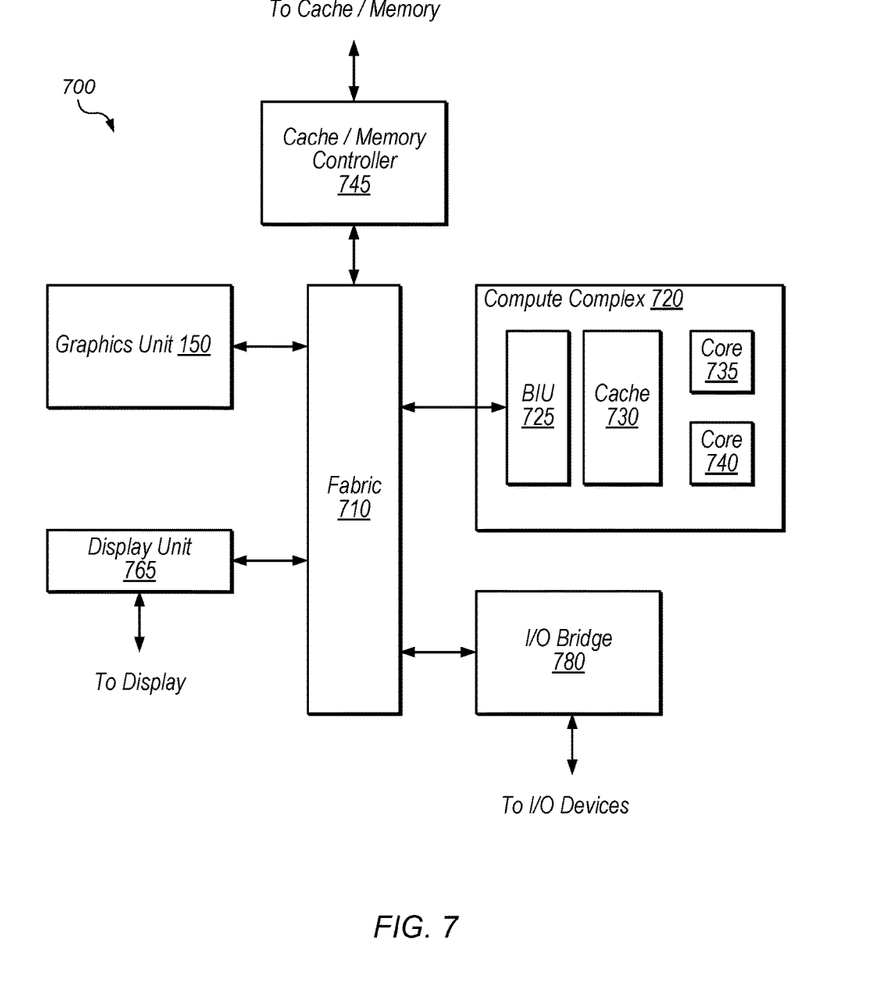
FIG. 7 is a block diagram illustrating an exemplary device.
Figure 8:
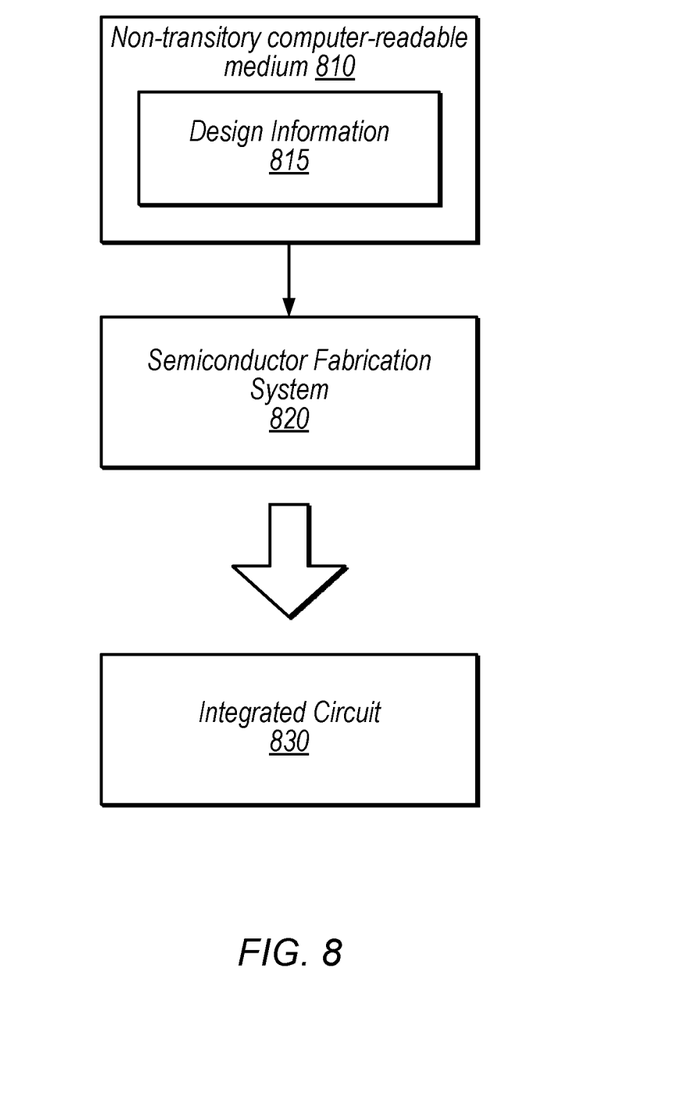
FIG. 8 is a diagram illustrating an exemplary computer-readable medium.

This disclosure initially describes, with reference to FIGS. 1A-1B, an overview of a graphics processing flow and an exemplary graphics unit. An exemplary encoding format for operand locations for different threads is shown in FIG. 2. Exemplary circuits for decoding the format of FIG. 2 are shown in FIGS. 3-4. Methods for using parallel circuitry to determine values for related threads are shown in FIGS. 5-6. FIG. 7 shows an exemplary device and FIG. 8 shows an exemplary computer-readable medium.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad" or just "quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview of Special Registers and Encodings

In some embodiments, special registers are configured to store data associated with individual work items or threads. The values in some of these registers may be used to compute local coordinates for each thread and may require complicated calculations to determine the values for each thread.

For example, for a fragment shader, special registers may indicate the pixel location within the tile associated with a thread or the pixel location within the render associated with a thread. For a compute shader, special registers may indicate X/Y/Z coordinates within a threadgroup or an X/Y/Z coordinate within a grid. This information may also be referred to as "thread indices." Speaking generally, various indices, coordinates, etc. are referred to herein using the term "operand location," given that this information indicates the location of data to be operated on. Operand locations are discussed for purposes of illustration and are not intended to limit the scope of the present disclosure, however. In various embodiments, disclosed encodings and techniques may be used for other types of information (e.g., information that does not specify the location of data to be operated on).

In some embodiments, a special register value indicates operand locations for multiple threads (e.g., 16 threads in exemplary embodiments discussed herein, although any of various number of threads may be supported). Graphics processing is often performed in parallel for 2×2 quads of pixels, which may be the SIMD group size in some embodiments (e.g., where threads in a SIMD group execute the same instructions in parallel, unless threads are predicated off). Therefore, in exemplary embodiments discussed herein, groups of four threads are processed together and the operand locations for threads may be based on other threads in the group. In other embodiments, groups of related threads having any of various numbers of threads may be implemented.

FIG. 2 shows an example encoding for 16 threads t0 through t15. In the illustrated embodiment bits 0-31 represent a 32-bit base that is common to all of the threads while bits 32-95 include offset and type value information for groups of threads (bits 32-57 for one group, bits 58-73 for another, and bits 74-95 for another).

In the illustrated embodiment, threads have a 2-bit type value (shown as "t15," "t14," etc. for the corresponding threads) that is used to determine its operand location based on the base field, its corresponding offset field (e.g, offset 0 for threads 0-3), and/or values for other threads. In other embodiments where different numbers of threads are grouped together, different numbers of bits may be used to specify type values. The base and offset information for a group of threads may be collectively referred to as address information.

The term "type value" is intended to be broadly construed to cover data values. These data values may have various sizes and encodings, in various embodiments. In some embodiments discussed herein, a type value behaves similarly to an opcode in that it indicates the operation to be performed (e.g., addition, taking a base address, etc.). In some embodiments, a type value also encodes an input value to be operated on for certain types of operations (e.g., a type value that indicates an addition operation may also encode an addend for the operation, as discussed in further detail below). For graphics threads, the type values may be used to encode operand locations relative to locations for other threads, for example. For other implementations such as neural networking, for example, the type values may indicate weights, operations to be performed, input values from other nodes, etc.

When discussing quads herein, thread numbers 0-3 are used to refer to the different threads in a quad. In some embodiments, the starting thread within a quad (thread 0) has an operand location of base+offset. The lower portion of FIG. 2 sets out example actions based on the 2-bit type value for each thread. In the illustrated embodiment, a value of 3 (11' in binary) indicates to subtract one from the previous thread value, a value of 2 (10' in binary) indicates to reset to the base address, a value of 1 (01' in binary) indicates to add one to the previous thread value, and a value of 0 indicates to take the same value as the previous thread. In some embodiments, the encoding scheme of FIG. 2 allows a great reduction in the size of the registers, e.g., relative to explicitly specifying operand locations for all threads.

As one detailed example, consider a situation where thread 1 has a type value of 3, thread 2 has a type value of 2 and thread 3 has a type value of 1. Recall that, in some embodiments, thread 0 will have an operand location of (base+offset). In some embodiments, thread 1 would then have an operand location of (base+offset−1) because its type value indicates to subtract one from the previous thread (thread 0). In some embodiments, thread 2 would have an operand location of (base) because its type value indicates to reset to the base. In some embodiments, thread 3 would have an operand location of (base+1) because its type value indicates to add one to the previous thread (thread 2).

The encoding of FIG. 2 may be referred to as "wrap-sum" encoding. Decoding such types of encodings efficiently may be desirable in order to avoid lengthening the critical path and to reduce overall power consumption.

Exemplary Sequential Decoding Circuitry

FIG. 3 is a diagram illustrating exemplary sequential decoding circuitry 300, according to some embodiments. Note that the sequential circuitry shown in FIG. 3 may have a longer critical path relative to the parallel decoding circuitry shown in FIG. 4, which will be discussed in detail below. The dashed boxes in FIG. 3 outline the circuitry configured to determine a value for different threads. In the illustrated embodiment, circuitry 300 is configured to generate outputs for four threads [0]-[3] in a quad.

In the illustrated embodiment, elements 302 and 304A-304C are 32-bit adders and elements 308A-308C and 310A-310C are multiplexers (MUXs) controlled based on the type values. Adder 302 adds the base and offset and provides its output as the operand location for thread[0]. Mux 308A determines whether to add 0, +1, or −1 to the result from adder 302 based on the type value for thread[1] and provides the selected input to adder 304A. Mux 310A then selects between the output of adder 304A and the base address based on whether the type value for thread[1] indicates a reset to the base address. MUX 310A outputs its selection as an operand location for thread[1]. The remaining circuitry performs similar operations based on the result for thread[1] to generate an operand location for thread[2] and then based on the results for thread[2] to generate an operand location for thread[3].

Circuitry 300, in the illustrated embodiment, include four 32-bit adders and three 32-bit multiplexers 310 in the critical path for the result of thread[3]. This may require 31 levels or more of complex gates, for example. Therefore, in embodiments where the critical path for decoding is an important design consideration, the parallel circuitry shown in FIG. 4 may be implemented.

Exemplary Parallel Decoding Circuitry

FIG. 4 illustrates exemplary decoding circuitry 400 for one thread, according to some embodiments. In some embodiments, circuitry similar to circuitry 400 is included for each of multiple threads and the circuitry for the related threads is configured to operate in parallel. Thus, for a quad of threads, for example, three instances of circuitry 400 may be implemented, one for each of threads 1-3 in the quad. Note that the illustrated circuitry is for thread 3, in some embodiments, and one or more logic blocks shown in FIG. 3 may be omitted for the circuitry that generates results for earlier threads 1 and 2. Further, in some embodiments, the result for thread 0 may simply be determined using an adder that adds the base and offset.

In the illustrated embodiment, the type value for each of threads 1-3 is sign extended by a respective one of sign extend circuitry 410A-410C. In some embodiments, this allows the type values to represent the amount to be added to the previous thread in 2's complement with a sufficient number of bits to represent the full potential range of differences in combined type value (e.g., values from −3 to +3 may need to be added to the base+offset, for three related threads that can each add +/−1 to the original thread 0). Sign extend circuitry 410A-410C may be described using the following hardware description pseudocode, in some embodiments:

type_thr1[2:0]={type1[1], type1[1], type1[0]};
type_thr2[2:0]={type2[1], type2[1], type2[0]};
type_thr3 [2:0]={type3[1], type3 [1], type3 [0]};

wherein type1 is the type value for thread 1, type2 is the type value for thread 2, and type 3 is the type value for thread 3.

AND logic 420A-420C, in the illustrated embodiment, is configured to determine whether a reset is indicated for each thread (e.g., whether its type value is 2) and pass the value along to the next thread's AND logic. In some embodiments, a later thread's AND logic is configured to consider whether prior threads had a reset type value. In some embodiments, initial reset detection circuitry may be described using the following hardware description pseudocode:

type1_no_reset=(type1[1:0]!=2'd2);
type2_no_reset=(type2[1:0]!=2'd2);
type3_no_reset=(type3[1:0]!=2'd2);

For thread 3, AND logic 420A-420C, in some embodiments, is configured to perform operations specified by the following pseudocode:

A_final_t[3][2:0]={type_thr1[2] & type_thr1[0] &
 (type2_no_reset & type3_no_reset), //bit 2
 type_thr1[1] & type_thr1[0] &
 (type2_no_reset & type3_no_reset), //bit 1
 type_thr1[0] & (type2_no_reset & type3_no_reset) //bit 0
 };
B_final_t[3][2:0]=
 {type_thr2[2] & type_thr2[0] & type3_no_reset, //bit 2
 type_thr2[1] & type_thr2[0] & type3_no_reset, //bit 1
 type_thr2[0] & type3_no_reset //bit 0
 };
C_final_t[3][2:0]={type_thr3[2] & type_thr3[0], //bit 2
 type_thr3[1] & type_thr3[0], //bit 1
 type_thr3[0] //bit 0
 };
type1_no_reset_t[3]=type1_no_reset;
type2_no_reset_t[3]=type2_no_reset;
type3_no_reset_t[3]=type3_no_reset;

As shown above, each AND logic block 420A-420C performs AND operations for thread 3. (As opposed to threads 1 and 2, where some of this logic may be optimized away relative to the circuitry for thread 3). The AND logic 420A-420C determines appropriate values as inputs to compressor 440 based on whether threads 1 and 2 had resets and based on the type values for threads 1 and 2, in some embodiments.

For thread 2, AND logic 420A-420C, in some embodiments, is configured to perform operations specified by the following pseudocode:

A_final_t[2][2:0]=
 {type_thr1[2] & type_thr1[0] & type2_no_reset, //bit 2
 type_thr1[1] & type_thr1[0] & type2_no_reset, //bit 1
 type_thr1[0] & type2_no_reset //bit 0
 };
B_final_t[2][2:0]=
 {type_thr2[2] & type_thr2[0], //bit 2
 type_thr2[1] & type_thr2[0], //bit 1
 type_thr2[0] //bit 0
 };
C_final_t[2][2:0]=3'b0;
type1_cause_no_t[2]=type1_no_reset;
type2_cause_no_t[2]=type2_no_reset;
type3_cause_no_t[2]=1'b1;

AND logic 420C and compressor 440 may be optimized away for the instance of circuitry 400 used for thread 2, in some embodiments (e.g., given that C_final_t for this thread is set to zero).

For thread 1, AND logic 420A-420C, in some embodiments, is configured to perform operations specified by the following pseudocode:

A_final_t[1][2:0]=
 {type_thr1[2] & type_thr1[0], //bit 2
 type_thr1[1] & type_thr1[0], //bit 1
 type_thr1[0] //bit 0
 };
B_final_t[1][2:0]=3'b0;
C_final_t[1][2:0]=3'b0;
type1_no_reset_t[1]=type1_no_reset;
type2_no_reset_t[1]=1'b1;
type3_no_reset_t[1]=1'b1;

AND logic 420B, 420C, compressor 440, and adder 450 may be optimized away for the instance of circuitry 400 used for thread 1, in some embodiments.

The A_final_t, B_final_t, and C_final_t values for a given thread are then provided to compressor 440, which is configured to add the three values, in combination with 3-bit adder 450. The output of adder 450 has a range of −3 to +3, in the illustrated embodiment, for the wrap-sum encoding of FIG. 2, so only three bits of output from adder 450 are needed, in this embodiment.

In some embodiments, adder 450 is configured to perform:

adjust[thread][2:0]=A_final_t[thread][2:0]+B_final_t
 [thread][2:0]+C_final_t[thread][2:0];

For the encoding of FIG. 2, adder 450 may be a 3-bit adder.

In some embodiments, reset logic 430 is configured to determine whether to zero out the offset (e.g., based on a reset), e.g., according to the following pseudocode:

offset_qualifier[thread]=type1_cause_no_reset_t[thread]
 &
 type2_cause_no_reset_t[thread] &
 type3_cause_no_reset_t[thread];

Thus, this circuitry is configured to set the offset to zero (based on generating an input to AND gate 460) when a reset has occurred for the current thread or any previous thread, in these embodiments.

32-bit adder 480, in some embodiments, in conjunction with 3:2 compressor 470 and AND gate 460, is configured to add the output of adder 450, the output of AND gate 460, and the base to generate the location result 490 for one of the threads. In some embodiments, this corresponds to the following hardware description pseudocode:

Result=base+
{22'b0, offset & {10{offset_qualifier[thread]}}}+
{{29{adjust[thread][2]}, adjust[thread] [2:0]};

As discussed above, in some embodiments, the circuitry for one or more of the threads may be optimized (e.g., because some of the inputs for thread 1 and thread 2 are constants). In other embodiments, identical circuitry may be used for all threads, e.g., to allow cell re-use and changes in which circuitry processes which thread numbers in a quad. In the illustrated embodiment, the critical path includes two AND gates, two 3:2 compressors, a 3-bit adder, and a 32-bit adder. This may result in 11 gates in the critical path, e.g., nearly three times shorter than the implementation of FIG. 3.

Further, given the thread-level parallelism of the circuitry, instances of circuitry 400 may be selectively placed in a low power state (e.g., power gated) when the corresponding thread is not being processed. Threads may be predicated off in embodiments with predicated execution, for example, and their corresponding circuitry may be turned off to reduce overall power consumption.

The disclosed techniques may be particularly advantageous given physical locality of adjacent threads in many GPU implementations. Further, in addition to advantages in storage reduction resulting from encoding, the disclosed encoding techniques may reduce transmission power consumption (e.g., because special register values are typically transmitted to other processing elements such as execution units).

In some embodiments, the circuitry to determine the result may be optimized (e.g., to reduce 3:2 compressor cells). From the equation, in some embodiments, the upper 22 bits of the result is either base[31:10]+22'b1, base[31:10]−22'b1 or base[31:0]. In some embodiments, to reduce compressor cells for bits 31:10, the equation is split into two parts:

Part 1. inc_dec[31:10]=base[31:10]+{{21{adjust[2]}, 1'b1}
Part 2. {carry, lower_Result[9:0]}=base[9:0]+
{offset & {10{offset_qualifier[thread]}}}+
{{7{adjust[thread][2]}, adjust[thread] [2:0]};
Result [31:0]={(carry^adjust[thread][2])?inc_dec[31:10]: base[31:10], lower_Result[9:0]}

Thus, part 2 may be performed using a ten bit compressor followed by a ten-bit adder, which may reduce overall area and power consumption.

Although various embodiments are discussed with reference to the encoding of FIG. 2, the disclosed techniques may be applied to various other encodings in which values for different threads are encoded based on values for other related threads. The disclosed techniques may reduce area needed for storage while maintaining a relatively short critical path for on-the-fly decoding. The disclosed techniques of FIG. 4 observe neighboring thread action in an independent manner (without waiting for results for the neighboring threads). In some embodiments, similar techniques and circuitry may be used in neural network processing where one node produces results based on neighboring nodes, e.g., by assigning related nodes to parallel instances of processing circuitry, similarly to related threads in the embodiment of FIG. 4. Therefore, various discussions herein relating to threads herein may be applied to neural network nodes, among other types of computations.

Speaking generally, the disclosed techniques may involve using type codes that are encoded to specify arithmetic values to be operated on to determine values based on one or more other thread's codes (e.g., if +1 is to be added, the type value may be a 2's complement representation of +1). As is known, the 2's complement is the complement of a number with respect to $2^N$ or the result of subtracting the number from $2^N$. A smaller adder is configured to handle a maximum possible range of outputs for the type value (e.g., −3 to +3 in disclosed embodiments) and the result of the smaller adder is added to other information (e.g., address information such as base and/or offset) using a larger adder.

Exemplary Methods

FIG. 5 is a flow diagram illustrating a method 500 for performing operations for related threads in parallel, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, first arithmetic circuitry performs an arithmetic operation (e.g., addition) on input values having a first number of bits, wherein the input values are type values for different threads and ones of the type values are encoded to represented (a) an operation to be performed for a thread by the first arithmetic circuitry and (b) an input value for the operation. For example, if a thread is to add a value X to a previous thread, the type value may be one of a set of known type values for addition and the value X may be encoded in the type value. The encoding may be 2's complement, for example. Other ones of the type values may not indicate an input value (e.g., a reset type value may simply indicate an operation to be performed by the circuitry such as taking a base address without providing an input for this operation). Although addition is discussed herein in various embodiments, other arithmetic operations such as multiplication, bitwise logic, shifting, etc. may be implemented for other encodings. In some embodiments, the first arithmetic circuitry corresponds to 3-bit adder 450.

At 520, in the illustrated embodiment, second arithmetic circuitry performs an arithmetic operation (which may or may not be the same operation performed by the first arithmetic circuitry) based on input values that include (a) an output of the first arithmetic circuitry and (b) an input that is common to the different threads and has a greater number of bits than the output of the first arithmetic circuitry. The input that is common may be a base address, for example, and/or an offset (e.g., in the embodiment of FIG. 2, the base is common to all threads and the offset is common to a quad of four threads).

In some embodiments, reset circuitry (e.g., AND logic 420A-420C and reset logic 430) may be configured to detect a reset type value and may zero inputs to one or more of the first and second arithmetic circuitry in response (e.g., by zeroing type value inputs to the first arithmetic circuitry or an offset input to the second arithmetic circuitry).

FIG. 6 is a flow diagram illustrating a more detailed method 600 for performing operations for related threads in parallel, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, an apparatus generates operand locations for a set of related threads in parallel. In the illustrated embodiment, this includes the method elements 520 through 540 of FIG. 6. The related threads may be a quad of graphics threads, for example.

At 620, in the illustrated embodiment, the apparatus receives information that indicates address information and type values for threads in the set. The address information may include a base address and an offset, for example. The type values may indicate what type of operation to perform for the thread (e.g., a reset or an arithmetic operation for a related thread) and may also be encoded to represent values to be operated on for arithmetic operation type values.

At 630, in the illustrated embodiment, in response to detection of a first type value for a first thread that indicates to determine an operand location based on the address information independently of other threads in the set (e.g., a reset type value), the apparatus determines the operand location for the first thread based on the address information (e.g., by taking the base address directly). This may involve zeroing inputs to arithmetic circuitry, in some embodiments.

At 640, in the illustrated embodiment, in response to detection of a second type value for a second thread that indicates to determine an operand location based on operand locations of one or more other threads in the set, the apparatus adds the second type value with third one or more type values of the one or more other threads in the set to determine the operand location, where the second type value and the third one or more type values are encoded in a format that specifies values to be added to the one or more other threads' operand location. In some embodiments, the ability to differentiate between non-arithmetically encoded type values and arithmetically encoded type values may improve overall decoding efficiency.

Exemplary Device

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 780, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

In some embodiments, various elements of device 700 may include clock gaters arranged hierarchically, including various series of DET clock gaters coupled to deliver clock signals to different portions of a clock tree. The disclosed techniques may reduce switching power consumption in device 700, balance the clock delay to different portions of device 700, reduce errors in device 700, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 8 is a block diagram illustrating an exemplary non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable medium 810, may comprise any of various appropriate types of memory devices or storage devices. Medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 810 may include other types of non-transitory memory as well or combinations thereof. Medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabrication at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 3, 4, and/or 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   first arithmetic circuitry configured to perform an arithmetic operation on input values having a first number of bits, wherein the input values are type values for different threads and ones of the type values are encoded to indicate:
   an operation to be performed for a thread, relative to values for other threads, by the first arithmetic circuitry; and
   an input value for the operation; and
   second arithmetic circuitry configured to perform an arithmetic operation to generate a result, for a particular thread of the different threads, based on input values that include: an output of the first arithmetic circuitry and an input that is common to the different threads and has a greater number of bits than the output of the first arithmetic circuitry.

2. The apparatus of claim 1, wherein the apparatus includes logic configured to zero one or more inputs to the first arithmetic circuitry in response to detecting a reset type value.

3. The apparatus of claim 1, wherein the first arithmetic circuitry includes a first adder and the second arithmetic circuitry includes a second adder.

4. The apparatus of claim 3, wherein the first arithmetic circuitry includes a first compressor and the second arithmetic circuitry includes a second compressor.

5. The apparatus of claim 1, wherein the different threads are graphics threads and the apparatus includes an instantiation of the first arithmetic circuitry and the second arithmetic circuitry for multiple ones of the graphics threads, wherein the instantiations of the first and second arithmetic circuitry are configured to operate in parallel.

6. The apparatus of claim 5, wherein the result is an operand location and wherein the input to the second arithmetic circuitry that is common to the different threads includes a base address.

7. The apparatus of claim 6, wherein type values for the different threads each indicate one of the following operations:
    subtract one from a value from another thread;
    reset by taking the base address;
    add one to a value from another thread; or
    take a value from another thread.

8. The apparatus of claim 5, wherein type value locations for the graphics threads are encoded using a value that indicates: a base address, an offset corresponding to the graphics threads, and a respective type value for each of the graphics threads that indicates an operation to generate a value for the graphics thread based on one of the other graphics threads or to reset to the base address.

9. An apparatus, comprising:
    circuitry configured to generate operand locations, in parallel, for different ones of a set of related threads, wherein to generate an operand location for a particular thread in the set, the circuitry is configured to:
        receive information that indicates address information and type values for threads in the set;
        in response to detection of a first type value for a first thread that indicates to determine an operand location based on the address information independently of other threads in the set, determine the operand location for the first thread based on the address information; and
        in response to detection of a second type value for a second thread that indicates to determine an operation location based on operand locations of one or more other threads in the set, add the second type value with third one or more type value of the one or more other threads in the set to determine the operand location, wherein the second type value and the third one or more type values are encoded in a format that specifies values to be added to the one or more other threads' operand location.

10. The apparatus of claim 9, wherein the format is 2's complement.

11. The apparatus of claim 9, wherein the address information includes a base address and an offset.

12. The apparatus of claim 9, wherein the apparatus is configured to sign extend the type values.

13. The apparatus of claim 9, wherein the apparatus is configured to determine the operand location based on operand locations of one or more other threads in the set using a first adder configured to add ones of the type values and a second adder configured to add an output of the first adder with the address information.

14. The apparatus of claim 13, wherein the apparatus includes a first compressor configured to generate inputs for the first adder and a second compressor configured to generate inputs for the second adder.

15. The apparatus of claim 13, wherein the apparatus is configured to zero one or more inputs to the first adder based on detecting the first type value.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:
    first arithmetic circuitry configured to perform an arithmetic operation on input values having a first number of bits, wherein the input values are type values for different threads and ones of the type values are encoded to represent values to be operated on by the first arithmetic circuitry; and
    second arithmetic circuitry configured to perform an arithmetic operation to generate a result, for a particular thread of the different threads, based on input values that include: an output of the first arithmetic circuitry and an input that is common to the different threads and has a greater number of bits than the output of the first arithmetic circuitry.

17. The non-transitory computer readable storage medium of claim 16, wherein the first arithmetic circuitry includes a first adder and the second arithmetic circuitry includes a second adder configured to operate on inputs having a greater number of bits than inputs of the first adder.

18. The non-transitory computer readable storage medium of claim 16, wherein the circuit is configured to zero one or more inputs to the first arithmetic circuitry in response to detecting a reset type value.

19. The non-transitory computer readable storage medium of claim 16, wherein the circuit includes an instantiation of the first arithmetic circuitry and the second arithmetic circuitry for each of the different threads, wherein the instantiations of the first and second arithmetic circuitry are configured to operate in parallel.

20. The non-transitory computer readable storage medium of claim 16, wherein type values for the different threads each indicate one of the following operations:
    subtract one from the value from another thread;
    reset by taking a base value;
    add one to the value from another thread; or
    take the value from another thread.

* * * * *